United States Patent
Keppel et al.

(10) Patent No.: US 12,438,960 B2
(45) Date of Patent: Oct. 7, 2025

(54) METADATA COMPACTION IN PACKET COALESCING

(71) Applicant: Intel Corporation, Santa Clara, CA (US)

(72) Inventors: David Keppel, Mountain View, CA (US); Chitra Natarajan, Queens Village, NY (US); Venkata Krishnan, Ashland, MA (US)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 17/691,003

(22) Filed: Mar. 9, 2022

(65) Prior Publication Data
US 2022/0201103 A1 Jun. 23, 2022

(51) Int. Cl.
*H04L 69/22* (2022.01)
*H04L 49/90* (2022.01)
*H04L 49/9057* (2022.01)

(52) U.S. Cl.
CPC .......... *H04L 69/22* (2013.01); *H04L 49/9057* (2013.01); *H04L 49/9068* (2013.01)

(58) Field of Classification Search
CPC .. H04L 69/22; H04L 49/9057; H04L 49/9068
See application file for complete search history.

(56) References Cited

U.S. PATENT DOCUMENTS

| | | | |
|---|---|---|---|
| 2019/0044889 A1 | 2/2019 | Serres et al. | |
| 2020/0204503 A1* | 6/2020 | Cornett | G06F 12/0802 |
| 2023/0102614 A1* | 3/2023 | Mitra | H04L 69/22 709/224 |

OTHER PUBLICATIONS

Maley, F. Miller and Devinney, Jason G., "Conveyors for Streaming Many-To-Many Communication," in 2019 EEE/ACM 9th Workshop on Irregular Applications: Architectures and Algorithms (IA3), Denver, CO, USA, 2019, 8 pages.
Nelson, Jacob et al., "Latency-Tolerant Software Distributed Shared Memory", USENIX Annual Technical Conference, Jul. 2015, 15 pages.
Ziv, Jacob and Lempel, Abraham, "Compression of Individual Sequences via Variable-Rate Coding", IEEE Transactions on Information Theory, vol. IT-24, No. 5, Sep. 1978, 7 pages.

* cited by examiner

*Primary Examiner* — Kent Krueger
(74) *Attorney, Agent, or Firm* — Compass IP Law PC (57) ABSTRACT

Examples described herein relate to coalescing one or more messages into a coalesced message and representing one or more fields of the metadata of the one or more messages using one or more codes, wherein at least one of the one or more codes uses fewer bits than that of original metadata fields to compact the metadata fields. In some examples, the metadata includes at least one or more of: a target processing element (PE) number or identifier, message length, operation to perform, target address where to read or write data, source PE number or identifier, initiator address in which to write result data, or message identifier.

20 Claims, 11 Drawing Sheets

METADATA COMPACTION IN PACKET COALESCING

BACKGROUND

Network packets carry application payload data bytes from one end-point to another end-point. Packet headers carry metadata such as checksum, cyclic redundancy check (CRC) codes, source and destination local identifiers (LIDs), length, address offset, operation type and others. When messages are large, the metadata overhead can be a small fraction of the total bytes transferred resulting in high payload efficiency. But with small messages, the metadata overhead may be large and significantly reduce network efficiency as the metadata transmitted through a network utilizes bandwidth that could otherwise be used to transmit payload data. As an example, in an Ethernet packet (following the Institute of Electrical and Electronics Engineers (IEEE) 802.3 format), the metadata overhead can be approximately 40 bytes. For an 8-byte application payload, 48 bytes are transmitted. If the network peak bandwidth is 100 Gbps, then peak payload bandwidth is ~16.7 Gbps, which amounts to <17% efficiency because the rest of the bandwidth is used for metadata.

An approach to improve network efficiency is coalescing, in which several small messages sent to the same target are combined and sent as a larger message. At the target, the large message is separated into the individual small messages. Coalescing improves network efficiency as the coalesced multi-message packet shares a single network header across the coalesced messages. Coalescing reduces some of the metadata overhead by avoiding duplication of these network header metadata fields that would be incurred if a message was sent uncoalesced in separate packets. Although coalescing results in multiple messages sharing a single network header and improves network efficiency, individual messages in a coalesced packet still carry other metadata, such as length, source/destination process identifier (ID), operation to be performed, message ID, and memory address offset for the data.

DETAILED DESCRIPTION

To attempt to reduce transmitted metadata overhead and improve the payload data efficiency due to reduced metadata bytes, per-message metadata compaction can be performed. For example, a sender and receiver can be configured with codes that represent metadata values so that codes, that represent metadata values and are smaller in size than the metadata, can be transmitted instead to a receiver. In some examples, if a metadata value is repeated for multiple sequential coalesced messages, the metadata value can be provided or configured once for the multiple sequential coalesced messages and the metadata value can be applied, at the receiver, for the multiple sequential coalesced messages.

Figure 1A:
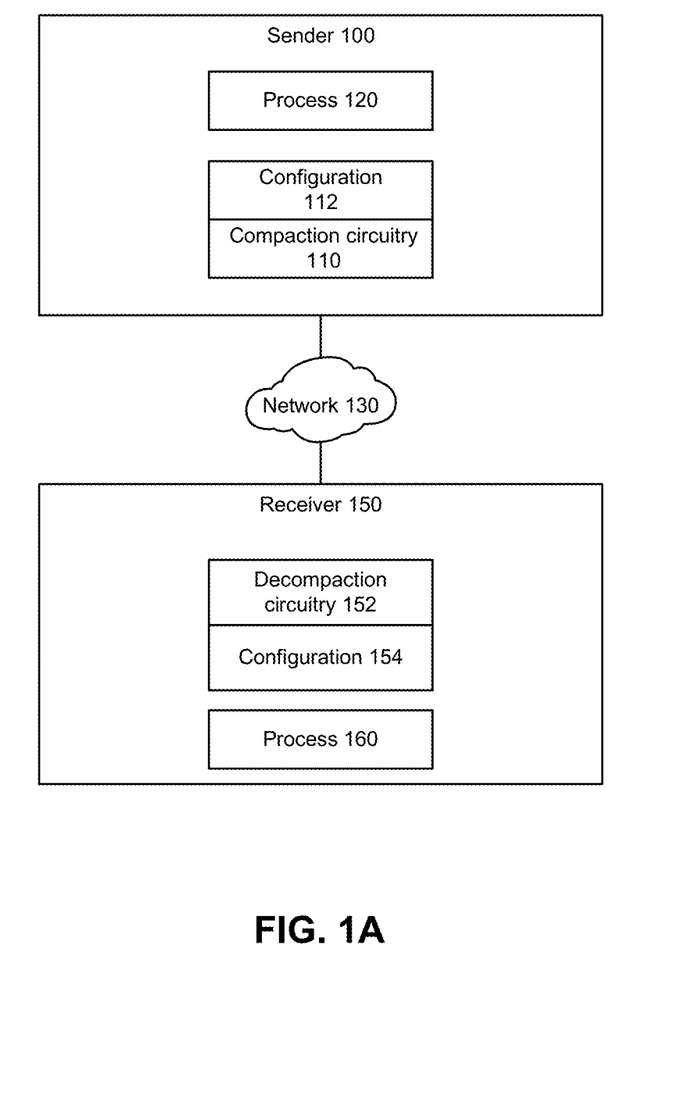
FIG. 1A depicts an example system.

FIG. 1A depicts an example system. Sender 100 can include compaction circuitry 110 that can represent one or more metadata as one or more codes, where the codes are smaller in number of bits than a number of bits to represent the metadata. Compaction circuitry 110 can reduce redundancy across multiple layer 3 (L3) transport layer communications. Receiver 150 can include decompaction circuitry 152 to de-compact codes in received packets into metadata and provide the metadata for processing. Receiver 150 can include a processing element (PE), a group of PEs, a compute node, or a group of compute nodes. In this example, sender 100 sends coalesced or non-coalesced messages with or without metadata compaction, through network 130, to receiver 150. Although a single receiver is depicted, sender 100 can send coalesced or non-coalesced messages with or without metadata compaction, through network 130, to multiple receivers.

An application, orchestrator, or other software or device can configure sender compaction circuitry 110 with configuration 112 to represent metadata as a code or indicate an exception case and include the metadata in full for a particular message in a transmitted coalesced packet or send the exceptions uncoalesced as separate packet. The application, orchestrator, or other software or device can configure receiver decompaction circuitry 152 with configuration 154 to recognize codes that represent metadata and exception cases and generate metadata based on a translation of the codes to metadata. Per-message metadata compaction can be configured for nodes with participating PEs, so that compaction configurations 112 and 154 are carried out on initiator and target. Configurations 112 and 154 can program metadata values once at application start, or at the start of a particular phase of the application, such as for an integer X number of messages, changing configurations for different phases if necessary.

An application program interface (API) can be used by an application, runtime, or job controller to configure compaction circuitry 110. Configuration 112 parameters can include one or more of: node count, processes per node, likely message lengths, likely size of the messaging region and thus offset, buffer sizes/number of messages, and others.

Metadata can include information such as one or more of: an initiator resource tracker identifier (ID), a target processing element (PE) number or identifier (e.g., process address space identifier (PASID)), message length, operation to perform (e.g., PUT, GET, ATOMIC_ADD, non-fetching ATOMIC operations, fetching ATOMIC_ADD operations, etc.), target address where to read or write data (e.g., offset), source PE number or identifier, initiator address in which to write result data, or Message ID (sequence number from source PE to target PE) (e.g., to use for reliability or in order delivery), and others. For some operations, such as GET and fetching operations, the sender/initiator can save an initiator PE, initiator address, and other information in a tracker, send an ID number for the tracker. The receiver/target can perform the indicated operation and return the result along with the tracker ID. An atomic operation can include arithmetic (e.g., add, subtract, multiply, divide), XOR, min-max, or others.

Sender 100 and/or receiver 150 can be implemented as part of a server, rack of servers, computing platform, data center, multiple data centers, or other environments. Sender 100 and/or receiver 150 can include processors such as one or more of: a central processing unit (CPU) core, graphics processing unit (GPU), field programmable gate array (FPGA), accelerator or application specific integrated circuit (ASIC). Processors can include an XPU, where an XPU can include one or more of: a CPU, a graphics processing unit (GPU), general purpose GPU (GPGPU), infrastructure processing unit (IPU) or other processing units (e.g., accelerator). In some examples, a core can be designed, manufactured, and/or sold by Intel®, ARM®, AMD®, Qualcomm®, Broadcom®, Nvidia®, IBM®, Texas Instruments®, among others. At sender 100, processors can execute an operating system (OS), drivers, and/or processes 120. At receiver 150, processors can execute an operating system (OS), drivers, and/or processes 160. Message coalescing and de-coalescing can use a combination of hardware, privileged drivers, application-level drivers, or application-level code.

A processor executed process 120 and/or 160 can include one or more of: applications, virtual machines (VMs), containers, microservices, serverless applications, thread, function, and so forth. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

Sender 100 and/or receiver 150 can include memory that includes one or more of: one or more registers, one or more cache devices (e.g., level 1 cache (L1), level 2 cache (L2), level 3 cache (L3), last level cache (LLC)), volatile memory device, non-volatile memory device, or persistent memory device. For example, the memory can include static random access memory (SRAM) memory technology or memory technology consistent with high bandwidth memory (HBM), or double data rate (DDR), processing-in-memory (PIM), near-data-processing (NDP), among others.

Referring again to compaction circuitry 110, compaction circuitry 110 can receive message transmit requests from process 120 and based on the target (e.g., receiver 150), selects a coalescing buffer where the message will be coalesced. Various examples of compaction configurations applied by compaction circuitry are described herein.

For example, a global PE number may be compacted. The global PE number can be deduced from the node number plus an offset value within the node. For example, a PE identifier (ID) metadata field may be compacted by recording the offset value. For example, with 1 million PEs, about 3 bytes are used to represent a full PE number, but with node-level compact coalescing and 256 PEs/node, messages (described herein) in a given coalesced message packet are set to 256 PEs, and a single byte can be used to represent the 256 PEs.

Compaction circuitry 110 can compact metadata such as length fields, operation fields, target address, or other fields as a compact code. A compact code can be included/configured merely once where multiple messages in a coalesced message are associated with the same metadata. For example, if messages using message metadata compaction are the same message length, then the length field does not need to appear in the message metadata for every one of those messages. For example, the length field for a message can be represented as a compact code to represent a few different pre-defined lengths with an escape code to indicate that a separate length field follows with the actual length for messages with a different length than the pre-defined common cases (if exceptions are also coalesced) or coalesced messages can all be a same length. The same length can be pre-configured and the length field is not repeatedly included for messages in a coalesced packet. Similarly, if messages using message metadata compaction use the same operation, then the operation field does not need to be repeated in the message meta-data. In another example, the target address can be encoded as an offset from a base address of a shared segment versus a full address to compact this field.

Some messages may not be subject to metadata compaction. For example, if compaction is configured for PUT messages only, then a GET message metadata is not compacted. Various examples of approaches for representing metadata for non-compactable messages are described herein. For example, put( ) and get( ) sizes 8B, 64B and 256B may be common and so compaction/compression is tuned to represent these sizes with compact codes and other sizes can be represented as an exception.

If a threshold number of messages are not-coalesced or not-compacted, reconfiguration can occur to change or adjust metadata compaction encoding and decoding. For example, if there is a phase with multiple PUT commands followed by a phase with multiple GET commands, per-message metadata compaction can be reconfigured at phase boundaries to provide more efficient compaction of command metadata.

Figure 1B:
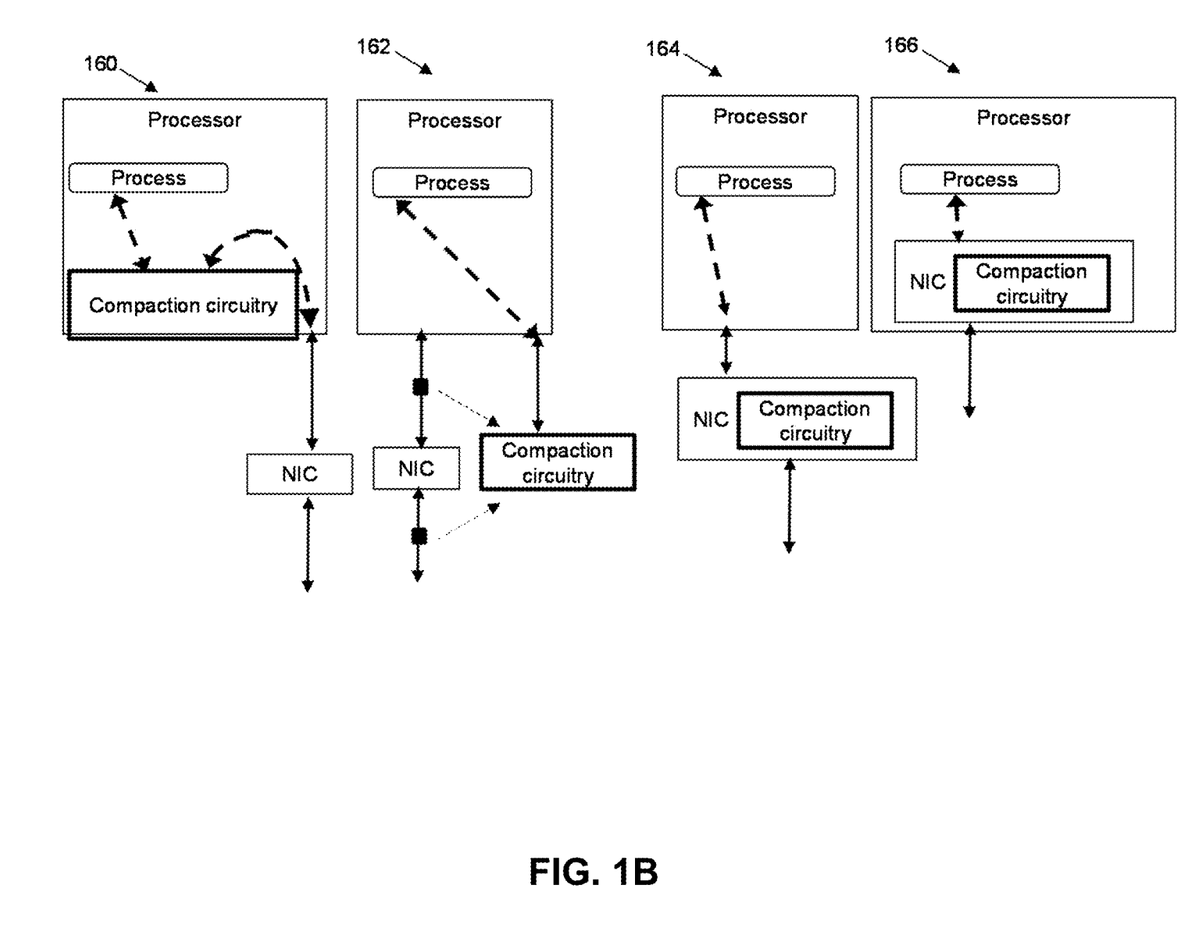
FIG. 1B depicts an example of placement of compaction or decompaction circuitry.

FIG. 1B shows various examples of placement of compaction or decompaction circuitry. In setup 160, compaction circuitry may be integrated into a processor (e.g., central processing unit (CPU) or graphics processing unit (GPU)). In setup 162, compaction circuitry may be integrated into direct memory access (DMA) technology, positioned in a field programmable gate array (FPGA) that is accessible through a device interface (e.g., PCIe). In setup 164, compaction circuitry may be integrated into a network interface controller (NIC). The can be implemented as one or more of: network interface controller (NIC), a remote direct memory access (RDMA)-enabled NIC, SmartNIC, router, switch, forwarding element, infrastructure processing unit (IPU), or data processing unit (DPU). Compaction circuitry may also be separate and distinct from a NIC. For example, a NIC may see also messages the same whether or not upstream software, firmware, or hardware compacts the messages. As a result, a NIC may perform similar receive operations for messages but some messages may be subject to further processing (e.g., decompression or decoalescing).

Compaction circuitry may be distributed among multiple components. For example, a processor may have circuitry which compacts processor messages, while another processor (e.g., GPU) may have circuitry which compacts GPU messages. Compaction circuitry may be distributed so that a first circuit compacts PE number but not length while a second circuit may compact length but not PE number.

In setup 166, compaction circuitry may be integrated into an application specific integrated circuit (ASIC) integrated into a NIC that is integrated into a GPU. Note that decompaction circuitry can included and used in setups such as setups 160, 162, or 164.

Figure 2:
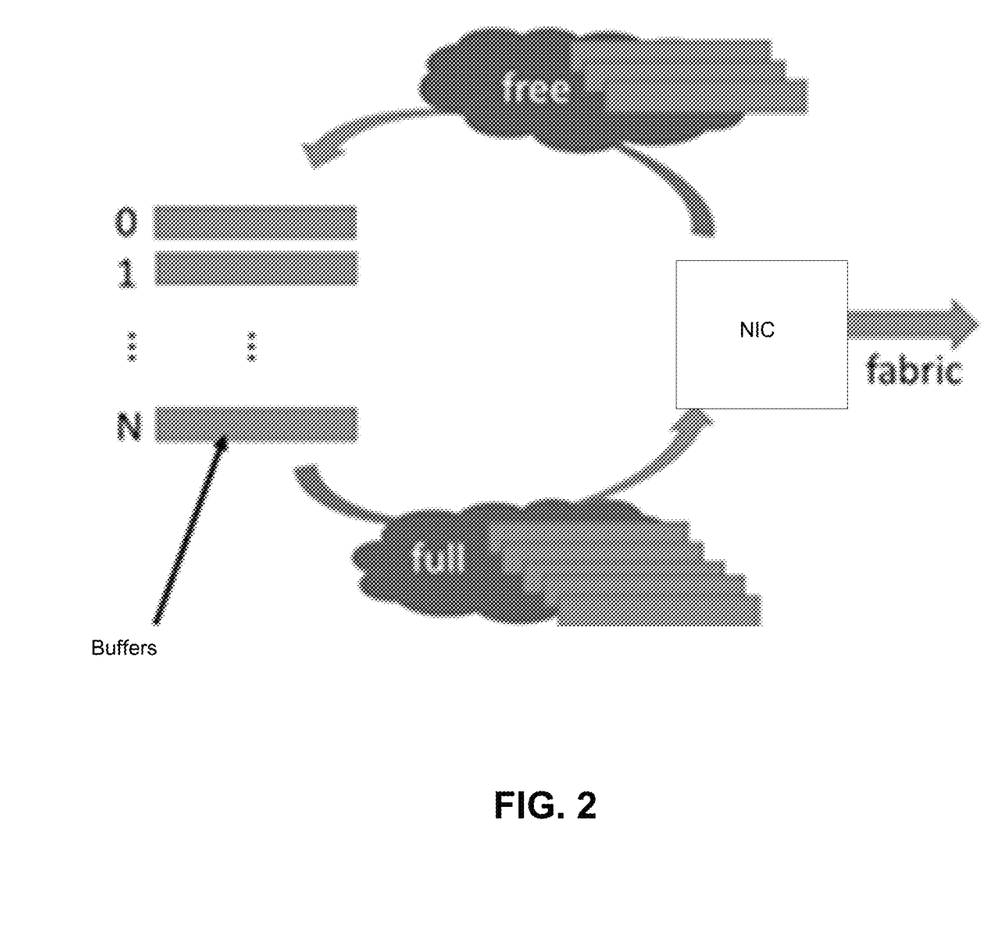
FIG. 2 depicts an example of buffering used for coalescing.

FIG. 2 depicts an example of a compaction circuitry maintaining coalescing buffers. For example, more coalescing buffers can be maintained than number of target nodes. While full buffers are being delivered, free buffers can be used to continue coalescing. Without free buffers being used to continue coalescing, blocking to wait for a buffer for one node may also delay coalescing to nodes with free coalescing buffers. Coalescing space can be allocated dynamically according to which targets are receiving the most traffic. Even for applications with the same average per-node traffic, there are often load transients.

Figure 3A:
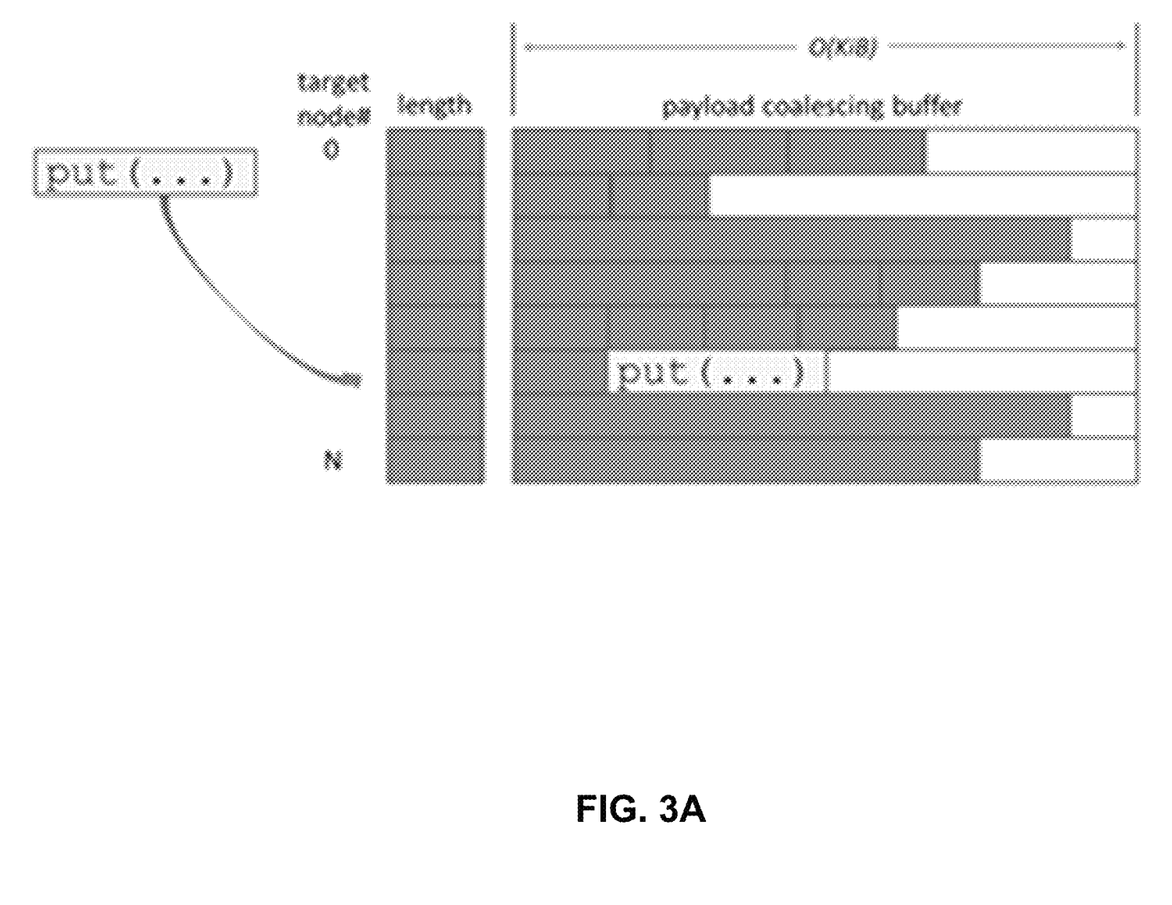
FIG. 3A depicts an example state of per-node coalescing buffers

FIG. 3A depicts examples of coalescing. Coalescing can be used whereby a compact header may be used for some cases or a longer header used for other cases. Leading bits can indicate message format. In the example of FIG. 3A, a coalescing operation can be configured for coalescing only put( ) operations with no return response. Messages can be packed in the coalescing buffer so that when the buffer fills, the buffer can be sent as the message payload for a single on-the-wire message that contains several application messages. FIG. 3A shows one coalescing buffer per target node, but other assignments are possible. For example, with 128 PEs per node, a configuration can use a coalescing buffer for each group of 32 PEs.

A message can include message delivery metadata and the message payload. A message can be associated with a request to send data or collect/receive data. A coalesced message can include one or more messages. A coalesced message can include multiple application messages, or messages. The sender and receiver can be both configured to coalesce and uncoalesce coalesced messages that only consists of put operations, and so there is no need to send bits to indicate the coalesced messages use put operation.

The message target can be used to select a coalescing buffer. If there is enough free space in the coalescing buffer, the message request may be inserted in the buffer. If the coalescing buffer is too full to accept the new request, the coalescing buffer can be queued to send. When coalescing buffer space is available, the message request may be inserted in the buffer.

If the message metadata is not compactable, then the message may be treated as a large message and can be sent without being coalesced. Alternatively, the message may be coalesced with an exception code indicating no metadata compaction is applied and sent with uncompacted metadata.

A group of senders and receivers may be configured to support specific compaction formats. Senders and receivers can thus agree on the message format in advance of a group of compacted messages being sent with those formats. In this way, a specification of the compaction formats need not be communicated along with the compacted messages.

Figure 3B:
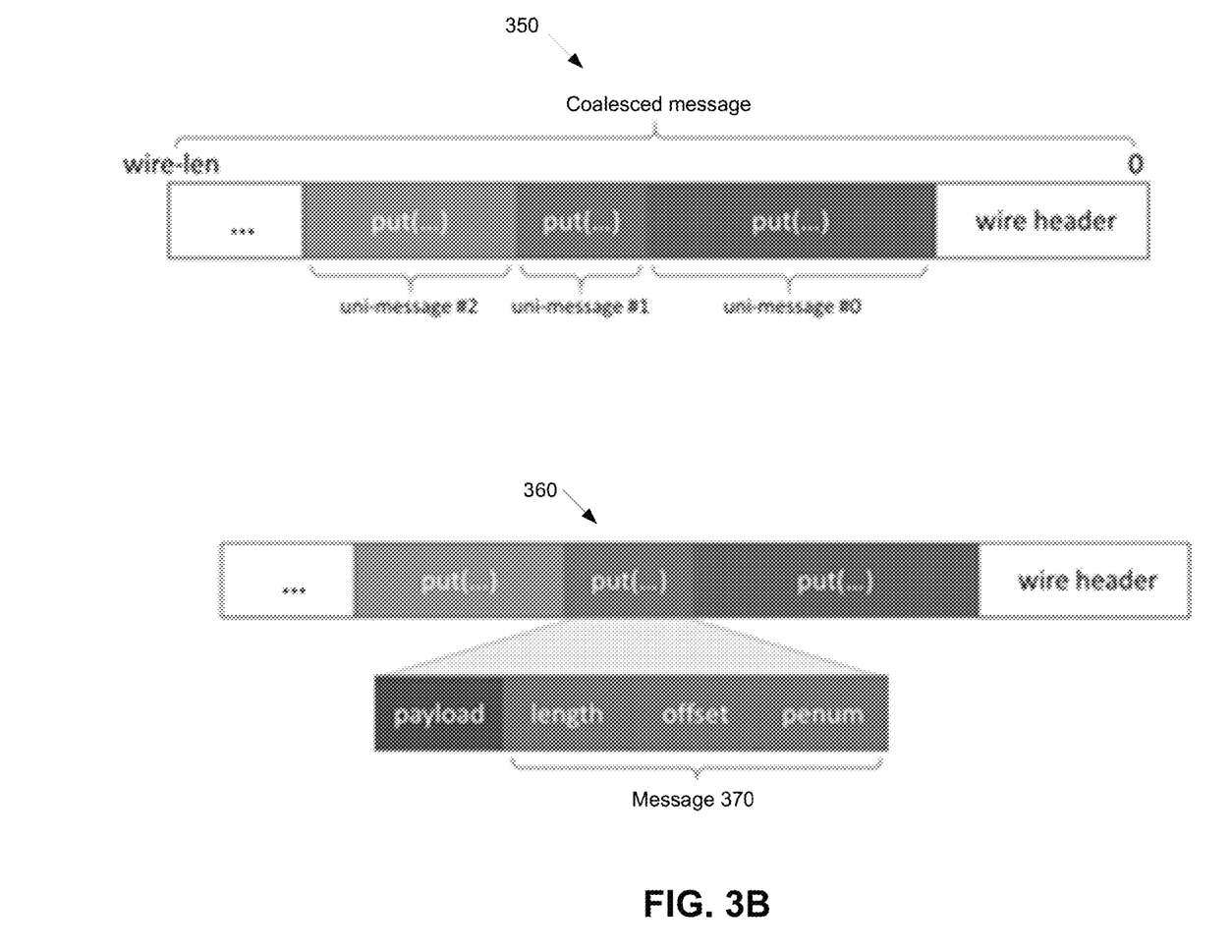
FIG. 3B zooms in on one buffer/multi-message comprised of multiple messages and further down into one message with payload and per message metadata (only 3 metadata fields shown for illustration, there can be more).

FIG. 3B shows a configuration which coalesces PUT messages into a coalesced message with no compaction. Note that the bit transmission order is from right to left. Coalesced message 350 includes multiple messages 0 to 2. Coalesced message 350 can be represented as coalesced message 360, which includes message header 370 that represents uncompacted meta-data with three fields, namely length, offset, and PE number. Without compaction, the length of these fields are determined by the maximum value possible. For example, if the maximum message length is 4 GB, the length field could be 32 b in every message metadata.

Figure 4:
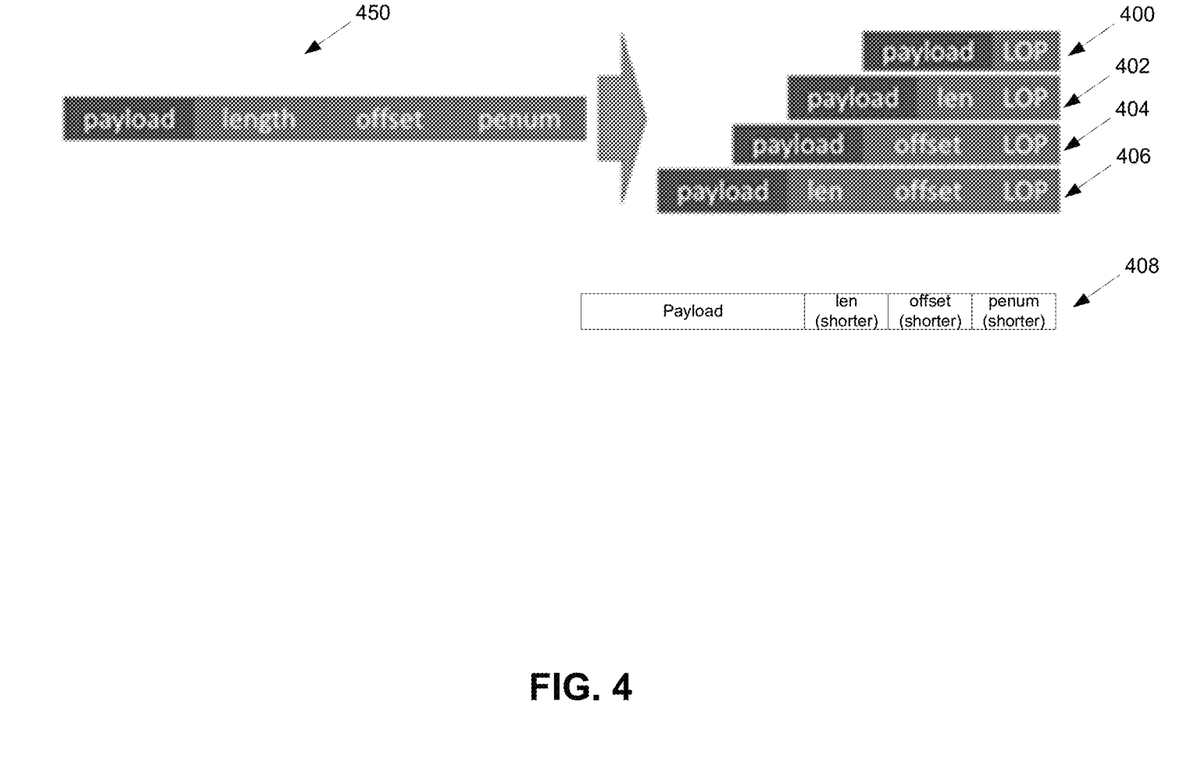
FIG. 4 depicts an example of message metadata encodings at different levels of compaction.

FIG. 4 depicts different levels of metadata compaction in a message starting with a message with uncompacted metadata. Uncompacted metadata 450 can be represented as one or more of 400 to 408. For example, a compacted message header can include a pre-defined compact metadata descriptor such as length offset PE number (penum) (LOP) descriptor that can include an integer number of bits to indicate the penum, and at least one bit that indicates either this is an application-selected common length (e.g., 8 bytes) or a few bits to indicate lengths among a range of lengths [1 . . . 256]. Similarly, at least one bit in LOP can indicate an offset that could be either a specific location (e.g., the location of a flag variable) or a few bits to indicate offsets among a predefined set of offsets. If messages with exceptions to pre-defined codes are also to be coalesced, one of the codes for a metadata field can be reserved to indicate exception to pre-defined configuration with the uncompacted full metadata for that field sent after the LOP. An integer number of bits used to represent PE number (penum) can be based on actual number of utilized PE values or identifiers as opposed to a maximum number of available PE values or identifiers. For example, for 32 available PEs, but merely PE 0 is messaged in all or most of the messages in an application phase, then the 1-bit P section of LOP can be set to 1 and no PE number value can be sent to indicate PE 0. If the destination is a different PE, the 1-bit section can be set to 0 to indicate exception and the actual PE number of pre-defined length is sent subsequently. For example, for 32 available PEs, and merely PE 0, 8, or 16 are messaged, then the PE number can be coded with 2 bits with code value 00, 01, or 10 to indicate which of the 3 PEs with code 11 indicating exception.

When an escaped value is utilized for multiple messages, there is no need to represent the escape in the LOP. For example, if the messages indicate a 4-byte offset, then no offset escape bits are included in LOP, thus allowing a smaller LOP or allowing the saved bits to be used to support more LOP values, e.g., for length or PE number.

Message 400 illustrates a metadata compaction with no exception for any of the 3 fields that only the LOP descriptor is enough to captures all of its meta-data. Message 402 depicts a compaction scenario where the message has an exception for length so an explicit length field is required. Similarly, message 404 depicts metadata compaction with an exception for the offset field in the metadata. Message 406 has exceptions for both length and offset. Message 408 includes a message with compact representations of length, offset, and penum fields.

In some cases, no LOP is included in a message. For example, for a message being compacted with len=8, offset=<address of "sum">, PE=24, operation=ATOMIC_ADD, the payload (the value to add to sum) is sent, and other values are the same for the compacted messages, and can be provided as part of configuration. If a configuration has an LOP carrying only escape indicators, then the LOP may be omitted. For example, if a configuration is length=8, offset=5 bytes, PE number=2 bytes, operation=PUT, then values are either implied (length and operation) or explicit (offset, PE number). In such case, the escape indicators for offset and PE number may be inferred and not sent in the LOP, and so the LOP may be omitted.

The size of fields len and offset may be smaller than the same field in a non-compacted message. For example, a message might have a 3-byte len field supporting message lengths from 1 byte to $2^{24}$ (e.g., 16 MiB). Compaction may be configured so that a subset of sizes are compacted. For example, len in 402 or 406 may be configured as a single byte, supporting up to 256 distinct sizes. The size of fields may vary between messages, with the size selected by other information. For example, there may be two values where one indicates a 3-byte offset field and the other indicates a 4-byte offset field.

Figure 5A:
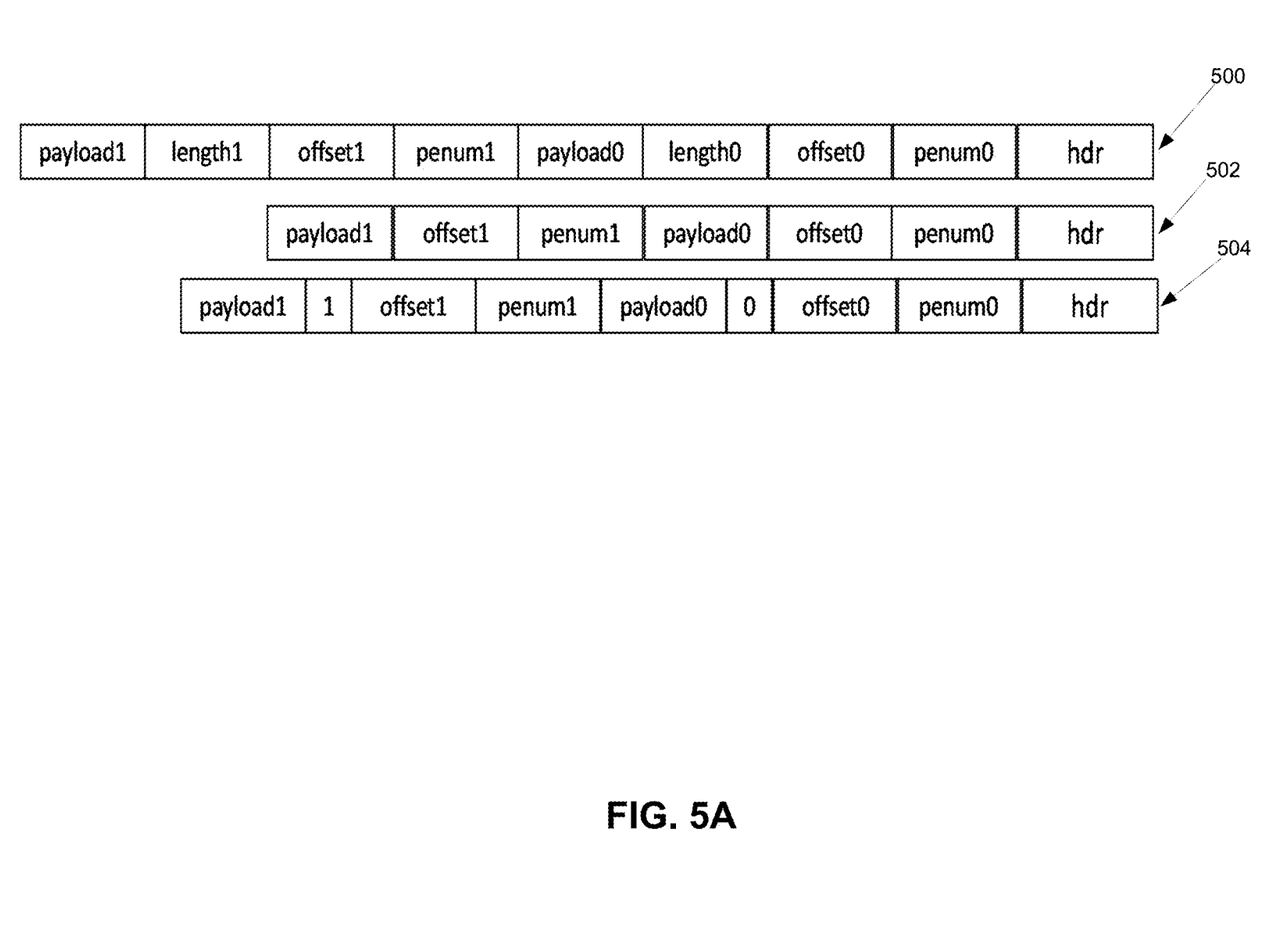
FIGS. 5A-5C depict examples of a multi-message packet comprised of messages with no compaction and compaction.

FIG. 5A depicts an example of no compaction and compaction scenarios. Fields can be transmitted from right to left. Coalesced message 500 is the no-compaction scenario, where a length field is provided for the messages with different payloads even if the application uses only one length. In coalesced message 502, as payloads of messages are of the same pre-configured length there is no length field in the compacted message header.

In format 504, as payloads can be one of two different pre-configured sizes, a compact one bit length value can indicate one of the two payload sizes. If two different payload sizes can be used, a one bit length value can indicate one of two payload sizes. If four different payload sizes can be used, a two bit length value can indicate one of the four payload sizes. A receiver can manage offset and updates offset to avoid overwriting data. In format 504, an exception code is not needed and not used as non-compacted messages are sent uncoalesced. However, if a particular length value is common, a 1 bit L field can be used which could indicate the particular common length value, but if not set, indicates an exception that is sent after the L field.

Figure 5B:
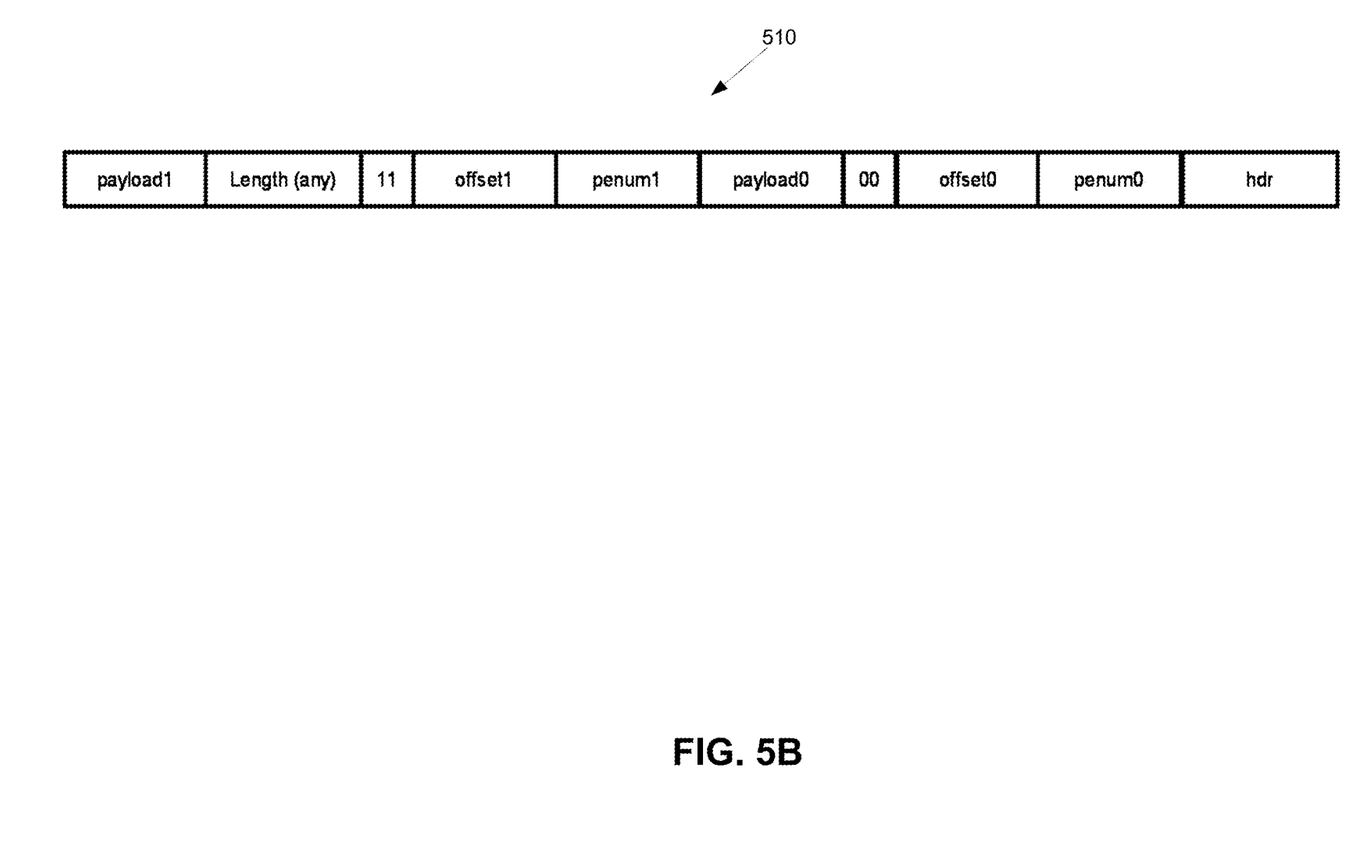

FIG. 5B depicts an example of encoding lengths using escape codes as exceptions are also coalesced. Fields can be transmitted from right to left. In format 510, an escape code in the length field indicates a length value is provided after the escape code. For example, a length field value of 00 can represent one of 3 pre-configured length values. For example, a length field value of 11 can indicate an escape code and that the length value is after the length field, when read from right to left. If exceptions are not coalesced, a two bit code can represent one of four potential length values. In some examples, multiple exception codes can be indicated. For example, length field values of 10 and 11 represent a different number of bytes that are to be sent that represent length values.

In general, a value of an escape code may indicate some encoding of the metadata follows. For example, if there are 66 PEs, then the LOP byte may encode 6 bits, where 0 . . . 62 represent the PE number, and an escape value of 63 means there is an additional byte which contains 0b00 to indicate PE=63, 0b01 to indicate PE=64, and 0b10 to indicate PE=65. That is, the byte value does not directly contain the metadata value, but rather a compact code which then leads to the metadata value.

Figure 5C:
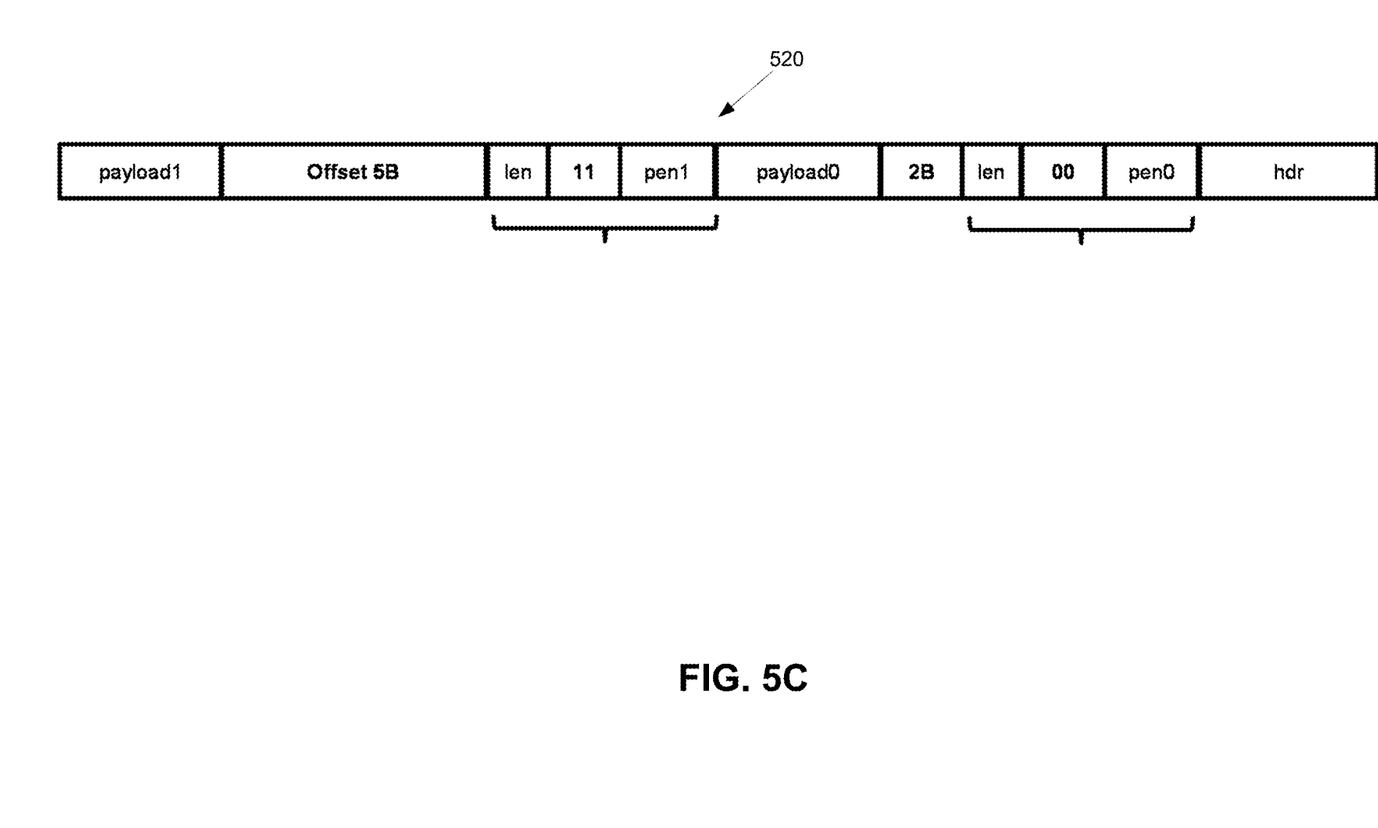

FIG. 5C depicts an example of encoding varying offset field length using codes. Fields can be transmitted from right to left. In format 520, the code in the offset field in the LOP part of the compacted metadata indicates an offset value is provided after the LOP header. For example, there may be 4 codes, where the value 00 indicates 2 bytes is used for the offset, 01 indicates 3 bytes, 10 indicates 4 bytes, and 11 indicates 5 bytes.

Figure 6:
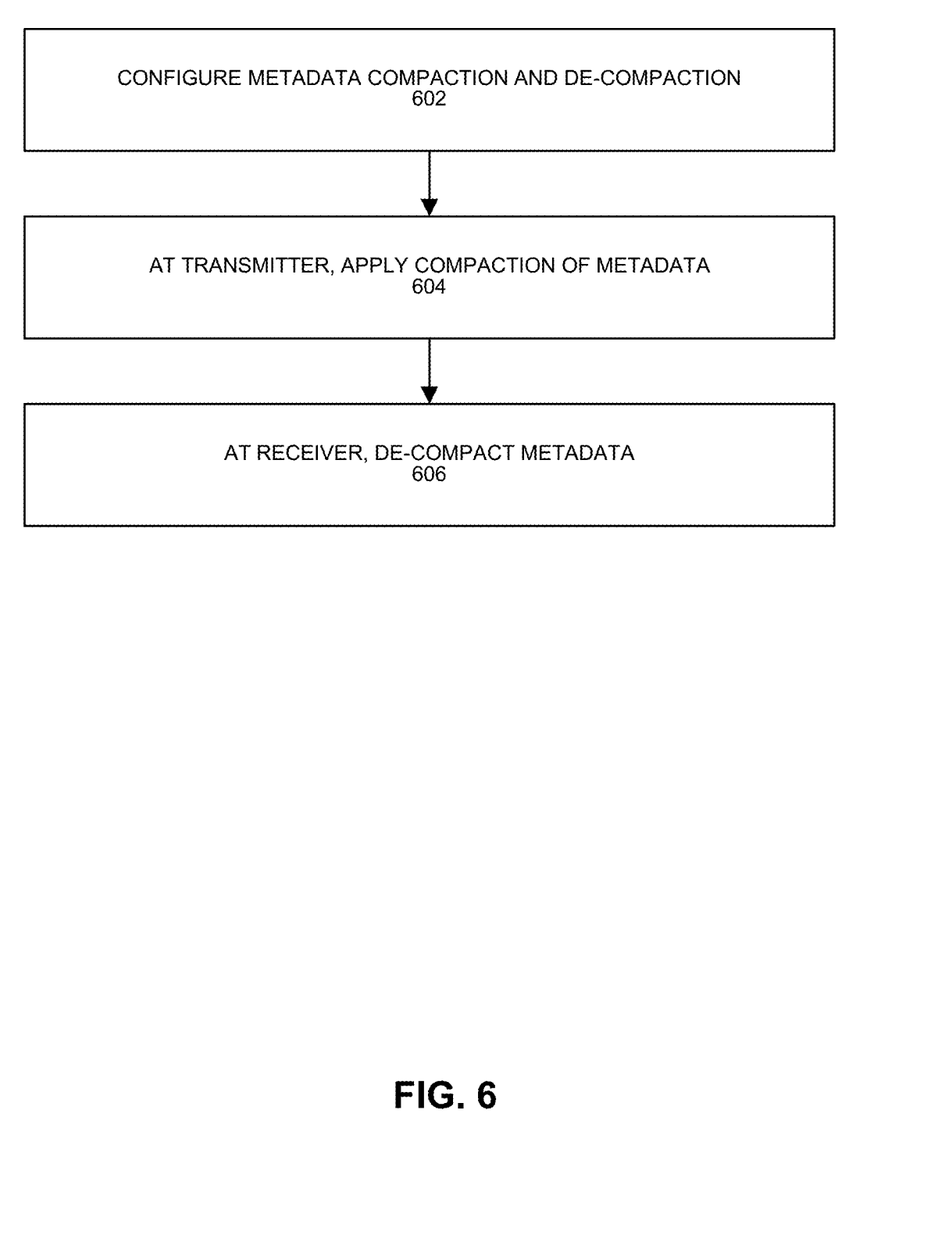
FIG. 6 depicts an example process.

FIG. 6 depicts an example process. At 602, configure sender and receiver with metadata encodings. For example, the configuration can configure metadata representation performed in metadata compaction at a transmitter in coalesced or non-coalesced messages for a phase of operation. For example, the configuration can configure metadata decoding performed in metadata de-compaction at a receiver for the phase of operation. Configuration of sender and receiver could be performed once and then re-used repeatedly at transmitter and at receiver.

At 604, based on the configuration, the transmitter can apply metadata compaction in a packet to be transmitted. For example, metadata can be compacted using codes that are fewer bits than would be used to represent the metadata. Examples of metadata that can be compacted include one or more of: a target processing element (PE) number or identifier (e.g., process address space identifier (PASID)), message length, operation to perform (e.g., PUT, GET, ATOMIC_ADD, etc.), target address where to read or write data (e.g., offset), source PE number or identifier, or Message ID (sequence number from source PE to target PE) (reliability or in-order delivery). In some examples, where metadata values do not change for a sequence of one or more messages, the metadata may be represented in the configuration or represented once at a beginning of a sequence of messages that share a same metadata value.

At 606, at a receiver, de-compaction of metadata can be performed to generate metadata from compact codes. The receiver can generate the metadata from the coalesced message based on the configuration.

Figure 7:
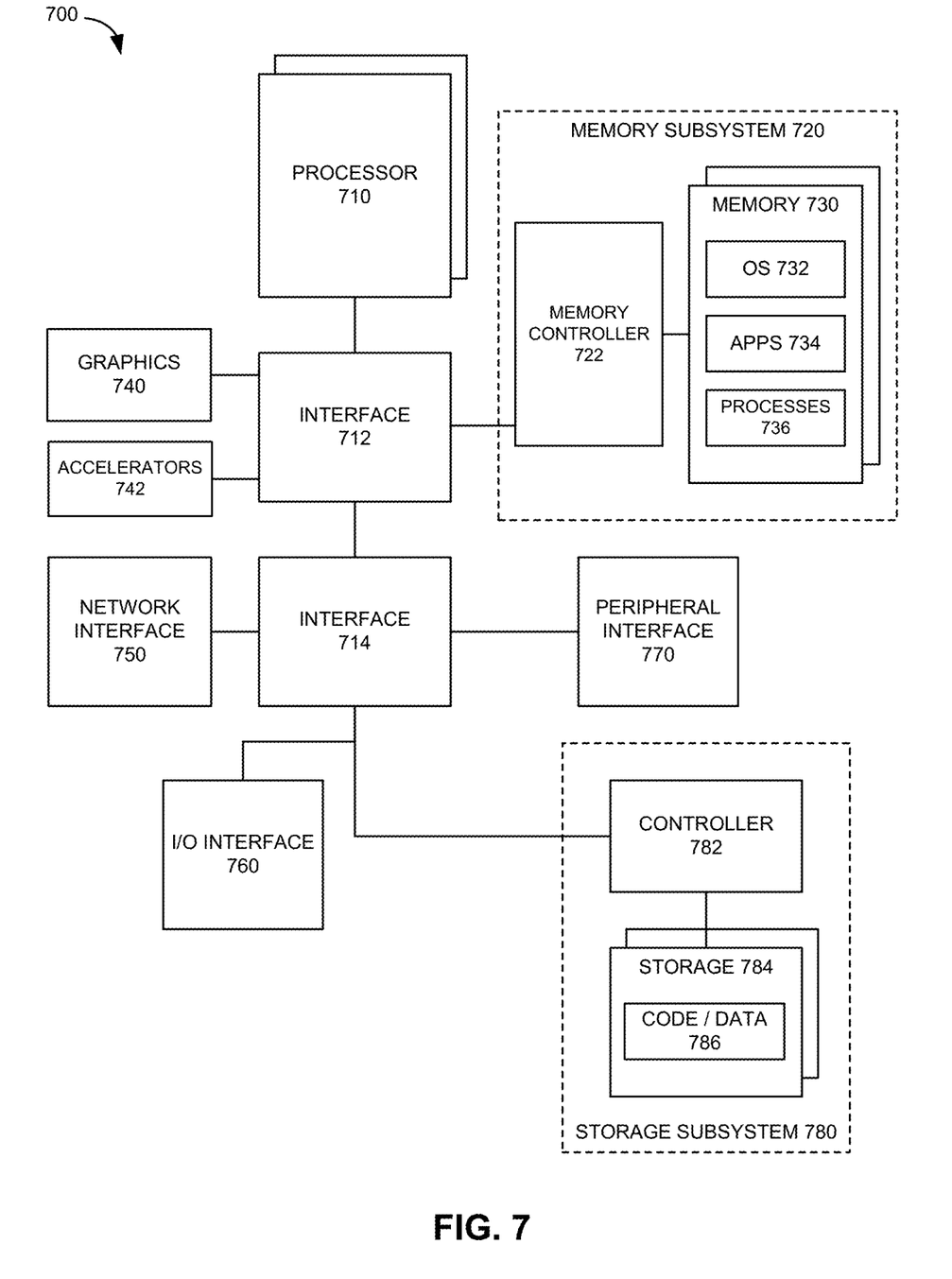
FIG. 7 depicts an example system.

FIG. 7 depicts an example computing system. System 700 can be used to configure message metadata compaction or de-compaction, as described herein. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 7K (ultra-high definition or UHD), or others. In one example, the display can include a touchscreen display. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, Broadcom®, Nvidia®, IBM®, Texas Instruments®, among others.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can execute a virtual switch to provide virtual machine-to-virtual machine communications for virtual machines (or other VEEs) in a same server or among different servers.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 750 can include a programmable pipeline or processors which can be programmed using Programming Protocol-independent Packet Processors (P4), C, Python, Broadcom Network Programming Language (NPL), NVIDIA® CUDA®, NVIDIA® DOCA™, or x86 compatible executable binaries or other executable binaries. In some examples, the programmable pipeline or processors can be configured to coalesce one or more messages into a coalesced message packet and represent one or more fields of the metadata of the one or more messages using one or more codes.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as standards released by JEDEC (Joint Electronic Device Engineering Council) on Jun. 27, 2007).

A non-volatile memory (NVM) device is a memory whose state is determinate even if power is interrupted to the device. In some examples, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to- MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

What is claimed is:

1. A non-transitory computer-readable medium comprising instructions stored thereon, that if executed by one or more processors, cause the one or more processors to:
coalesce one or more messages into a coalesced message and
represent one or more fields of metadata of the one or more messages using one or more codes, wherein at least one of the one or more codes uses fewer bits than that of original metadata fields to compact the metadata fields.

2. The computer-readable medium of claim 1, wherein the metadata comprises at least one or more of: an initiator resource tracker identifier (ID), a target processing element (PE) number or identifier, message length, operation to perform, target address where to read or write data, source PE number or identifier, initiator address in which to write result data, or message identifier.

3. The computer-readable medium of claim 2, wherein the operation to perform comprises one or more of: PUT, GET, non-fetching ATOMIC operations, or fetching ATOMIC operations.

4. The computer-readable medium of claim 1, wherein the represent one or more fields of the metadata of the one or more messages using one or more codes is based on usages by sender and receiver processes such as number of used processing elements (PEs), or accepted lengths.

5. The computer-readable medium of claim 1, wherein a value of the code is to indicate an escape code and a metadata is to be derived based on data that is to follow the escape code.

6. The computer-readable medium of claim 1, wherein a value of the code is to indicate a portion of a metadata value and another portion of the metadata value is to follow the code.

7. The computer-readable medium of claim 1, wherein the code applies to multiple payloads.

8. A method comprising:
coalescing one or more messages into a coalesced message and
representing one or more fields of metadata of the one or more messages using one or more codes, wherein at least one of the one or more codes uses fewer bits than that of original metadata fields to compact the metadata fields.

9. The method of claim 8, wherein the metadata comprises at least one or more of: an initiator resource tracker identifier (ID), a target processing element (PE) number or identifier, message length, operation to perform, target address where to read or write data, source PE number or identifier, initiator address in which to write result data, or message identifier.

10. The method of claim 9, wherein the operation to perform comprises one or more of: PUT, GET, non-fetching ATOMIC operations, or fetching ATOMIC operations.

11. The method of claim 8, wherein the representing one or more fields of the metadata of the one or more messages using one or more codes is based on usages by sender and receiver processes such as number of used processing elements (PEs), or accepted lengths.

12. The method of claim 8, wherein a value of the code is to indicate an escape code and a metadata is to be derived based on data that is to follow the escape code.

13. The method of claim 8, wherein a value of the code is to indicate a portion of a metadata value and another portion of the metadata value is to follow the code.

14. The method of claim 8, wherein the code applies to multiple payloads.

15. An apparatus comprising:
a network interface controller (NIC) and
at least one processor, wherein the NIC is configured to:
coalesce one or more messages into a coalesced message and
represent one or more fields of metadata of the one or more messages using one or more codes, wherein at least one of the one or more codes uses fewer bits than that of original metadata fields to compact the metadata fields.

16. The apparatus of claim 15, wherein the metadata comprises at least one or more of: an initiator resource tracker identifier (ID), a target processing element (PE) number or identifier, message length, operation to perform, target address where to read or write data, source PE number or identifier, initiator address in which to write result data, or message identifier.

17. The apparatus of claim 16, wherein the operation to perform comprises one or more of: PUT, GET, non-fetching ATOMIC operations, or fetching ATOMIC operations.

18. The apparatus of claim 15, wherein the represent one or more fields of the metadata of the one or more messages using one or more codes is based on usages by sender and receiver processes such as number of used processing elements (PEs), or accepted lengths.

19. The apparatus of claim 15, wherein a value of the code is to indicate an escape code and a metadata is to be derived based on data that is to follow the escape code.

20. The apparatus of claim 15, wherein a value of the code is to indicate a portion of a metadata value and another portion of the metadata value is to follow the code.

* * * * *